United States Patent
Oikawa et al.

(10) Patent No.: US 7,151,866 B2
(45) Date of Patent: Dec. 19, 2006

(54) OPTICAL DEVICE MODULE

(75) Inventors: Yoichi Oikawa, Yokohama (JP);
Hirofumi Aota, Yokohama (JP);
Kazuaki Akimoto, Yokohama (JP);
Hideyuki Miyata, Kawasaki (JP);
Tadao Nakazawa, deceased, late of Kanagawa (JP); by Yumi Nakazawa, legal representative, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 75 days.

(21) Appl. No.: 10/807,520

(22) Filed: Mar. 24, 2004

(65) Prior Publication Data

US 2005/0089275 A1    Apr. 28, 2005

(30) Foreign Application Priority Data

Oct. 22, 2003 (JP) .............................. 2003-362531

(51) Int. Cl.
*G02B 6/12* (2006.01)

(52) U.S. Cl. ........................................................ 385/14

(58) Field of Classification Search .................. 385/14
See application file for complete search history.

(56) References Cited

U.S. PATENT DOCUMENTS

| | | | |
|---|---|---|---|
| 5,717,803 A * | 2/1998 | Yoneda et al. | 385/89 |
| 5,848,210 A * | 12/1998 | Kimura | 385/89 |
| 6,477,284 B1 * | 11/2002 | Oda et al. | 385/14 |
| 6,522,793 B1 | 2/2003 | Szilagyi et al. | |
| 6,829,079 B1 * | 12/2004 | Oda et al. | 359/318 |
| 6,934,448 B1 * | 8/2005 | Akashi et al. | 385/49 |
| 2003/0053765 A1 * | 3/2003 | Oda et al. | 385/88 |
| 2003/0123805 A1 * | 7/2003 | Akashi et al. | 385/49 |
| 2005/0089282 A1 * | 4/2005 | Oikawa et al. | 385/92 |

FOREIGN PATENT DOCUMENTS

| | | |
|---|---|---|
| EP | 0757276 | 2/1997 |
| EP | 0889349 | 1/1999 |
| EP | 1094355 | 4/2001 |
| EP | 1191361 | 3/2002 |
| JP | 61190322 | 8/1986 |
| JP | 8-143369 | 6/1996 |
| JP | 9-049994 | 2/1997 |
| JP | 11-326855 | 11/1999 |
| JP | 200075152 | 3/2000 |
| JP | 2000-249853 | 9/2000 |
| JP | 2001-330811 | 11/2001 |
| JP | 2002-090563 | 3/2002 |

OTHER PUBLICATIONS

Nakazawa, T., LiNbO₃ Tunable Wavelength Filter, Configuration and Operating Principle of AOTF, Optorics, 1995, May 10, 1999, pp. 155-156.

T. Nakazawa, et al., "Development of Lithium-Niobate Tunable Filters", Technical Research Reports of the Institute of Electronics, Information and Communication Engineers, 1996, pp. 79-84.

(Continued)

*Primary Examiner*—Brian Healy
*Assistant Examiner*—Mary El-Shammaa
(74) *Attorney, Agent, or Firm*—Staas & Halsey LLP

(57) ABSTRACT

An optical device module includes an optical device with a plurality of electrodes disposed at predetermined positions, a substrate disposed oppositely to the optical device and with wiring patterns for connecting to the electrodes, and a wiring which connects the electrodes to the wiring patterns.

20 Claims, 14 Drawing Sheets

OTHER PUBLICATIONS

Yariv, Amnon, et al., "Optical Waves in Crystals, Propagation and Control of Laser Radiation", 1984.

European Search Report for corresponding European Patent Application No. EP04007642 dated Jul. 7, 2006 (in English).

* cited by examiner

OPTICAL DEVICE MODULE

CROSS-REFERENCE TO RELATED APPLICATIONS

This application is based upon and claims the benefit of priority from the prior Japanese Patent Application No.2003-362531, filed on Oct. 22, 2003, the entire contents of which are incorporated herein by reference.

BACKGROUND OF THE INVENTION

1) Field of the Invention

The present invention relates to technology for maintaining the temperature distribution within an optical device uniform.

2) Description of the Related Art

In recent years, the information transmission volume has been increased by the popularization of the Internet, etc. and construction of a high-speed and large-volume network is required irrespective of at home or abroad. In particular, for Japan in which the Internet diffusion rate is flagging at a level of 37%, which ranks as low as the 14th among major countries in the world, early improvement of network infrastructure is a key issue.

Therefore, the Government has been promoting the IT revolution named "e-Japan Strategies" since 2001 to stay well ahead in the race of international competition in the 21st century. In this "e-Japan Strategies," Japan aims at becoming the world's most advanced IT nation within 5 years, aims to provide high-speed constant access network (several Mb/s) to at least 30 million household and ultra high-speed constant access (30 Mb/s to 100 Mb/s) to 10 million households at extremely low rates, and aims to build an "World Highest Level Advanced Information and Telecommunications Network Society" where everyone can enjoy the IT benefits.

As a means for achieving this "World highest level advanced information and telecommunications network society," it is assumed that "PhotoniXnetwork Technique" is the most effective and indispensable, and even in the priority plan of "e-Japan Strategies," after three years, development and promotion of "PhotoniXnetwork technique" are requested, such as materialization of 1000 waves/core wavelength-division multiplexing technique, practical application of 10 Tbps optical router technique, practical application of technique to control and manage the optical network without converting to electrical signals, etc.

And the wavelength division multiplexing (WDM) system is now under development and practical application as a telecommunications system which can remarkably increase the transmission capacity. In each node which composes the WDM system, functions to branch and insert optional wavelength are essential, and as an optical device which can materialize these functions, an acousto-optic tunable filter (AOTF) utilizing acousto-optic effects attracts keen attention of the people concerned and are studied and developed in many institutes. This device provides excellent advantages such as simultaneous selection of multiple wavelengths, wide wavelength selection band exceeding 100 nm, etc. In addition, as an optical device which adds and drops a large number of optical signals, optical add/drop module arrayed waveguide grating is an important key device, too, and provides advantage that a device which matches signal wavelength grid, 0.8 nanometer (nm) intervals to a device which matches to grids ¼ the intervals can be manufactured.

The AOTF construction and operating principle using the LiNbO3 substrate have been already well-known (for example, see non-patent literatures 1 and 2). FIG. 13 is a top view one of an example of the configuration of a conventional acousto-optic tunable filter (AOTF). The acousto-optic tunable filter is sometimes referred to simply as optical filter. A substrate 204 that composes an acousto-optic tunable filter 202 forms optical waveguide 208 by Ti diffusion with X-cut LiNbO3. An acoustic wave is formed by patterning an inter-digital transducer (IDT) 206 that generates acoustic waves. A polarization beam splitter (PBS) 212 is formed by Ti-diffusion etc. The incoming light is polarized and separated by the polarization beam splitter (PBS) 212 into two beams, each beam passes through a surface acoustic wave (SAW) guide 210, the two beams are polarized and synthesized by the polarization beam splitter 212, and a transmitted light is output to a transmitting light port. Only the wavelength corresponding to the frequency of SAW generated by the inter-digital transducer (IDT) 206 is polarized and converted when it passes through the SAW guide 210 and output to a branched light port. Reference numeral 214 denotes an absorber which absorbs the surface acoustic wave (for example, see patent literature 1).

When SAW is excited by acousto-optic effects which the LiNbO3 crystal has, the crystal axis is tilted. With the tilting of the crystal axis, the SAW shifts between positive and negative in a cycle. This one cycle functions as a just ½ wavelength plate for a specific optical wavelength. That is, for an optical signal with a specific wavelength, the microscopic ½ wavelength plate looks like alternately tilting at microscopic angles with respect to the crystal axis. This is exactly the principle of the FSF (folded Solc filter) (for example, see non-patent literature 3). The light signal moves vibrating on a Poincare sphere by FSF and becomes polarized light orthogonal to the incoming polarized light exactly at the SAW guide output point.

On the other hand, because for optical signals other than the specific wavelength, the condition looks like filters which slightly shift from the ½ wavelength plate aligned in a line, optical signals are averaged and no polarization conversion is generated. Because selective filter characteristics are obtained by such principle, excellent filter characteristics with narrow pass band can be obtained because even a slight wavelength change is filtered as the device length increases. Since this is a device with long device length as described above, various problems occur in the module construction, too.

For various techniques to improve the characteristics of a simple device are known. These techniques include an acousto-optic filter comprising a light waveguide for propagating single relative rectilinear polarized light, a surface acoustic wave (SAW) generating means mounted on the optical waveguide for generating an SAW, and an interaction region which distributes a propagation loss of the SAW spatially and converts a specific wavelength component of the single relative rectilinear polarized light propagated in the light waveguide into rectilinear polarized light which crosses this at right angles (for example, see patent literature 2).

In addition, there is well-known is a light wavelength characteristics adjusting method for adjusting filter wavelength characteristics by changing the shape and location of a strain-providing section after manufacturing an element with the strain providing section for correcting local double refraction index of an optical waveguide (for example, see patent literature 3).

In addition, there also well-known is a wavelength filter with an absorber for absorbing an SAW by each reflective electrode to the outside of the optical waveguide by forming the optical waveguide and excitation electrodes for exciting the SAW on an acousto-optic crystal substrate and disposing reflective electrodes on propagation passage of the SAW (for example, see patent literature 4).

For a soaking structure in a module using a waveguide device, a waveguide type optical module is well known, in which a heating/cooling element for controlling the waveguide type optical element temperature via a soaking plate and heat buffer layer is installed on the waveguide type optical element with temperature dependency and at least part of the soaking plate is brought into contact with the waveguide type element (for example, see patent literature 5).

Furthermore, an arrayed waveguide grating which uses an optical add/drop module comprises, a waveguide chip (including, for example, optical substrate such as silicon, quartz, sapphire, etc.) with an arrayed waveguide (channel waveguide) with optical add/drop functions formed on the surface, a slab waveguide, and a soaking plate which bonds to the rear surface of waveguide chip and soaks waveguide chip, wherein the upper plate for an optical fiber connection is installed to the surface with an arrayed waveguide of a waveguide chip formed (for example, see patent literature 6).

FIG. 14 is a top view of another example of the configuration of the conventional acousto-optic tunable filter. A signal wiring is installed on an inter-digital transducer, when a plurality of optical waveguides are arranged on one substrate, to achieve multichanneling. As shown in FIG. 14, when multichanneling is achieved, signal wiring installation by fine line patterns is adopted. That is, the acousto-optic tunable optical filter 202 composes a plurality of channels (for example, channels 1, 2) using the configuration same as that shown in FIG. 13 on LiNbO3 substrate 204.

Next, FIG. 15 is to explain heat resistance of module construction according to a conventional technique. As shown in FIG. 15, the acoust-optic tunable filter 202 of LiNbO3 waveguide type is generally modularized in the following manner. That is, a heater 224, which is a temperature control section, is fixed to a soaking plate 222, for example, copper plate, etc. intervened on the rear surface of the substrate 204 made of X-cut LiNbO3. The entire structure is housed in a package (PKG) 226. Each optical fiber, etc. for optical signals connected to the substrate 204 are pulled out through insertion holes formed in the package 226. Reference numeral 230 is a lid which covers an opening at the top surface of package 226.

FIG. 16 is a circuit diagram of a heat equivalent circuit based on FIG. 15. As shown in FIG. 16, the heat conductivity in the module construction of the acousto-optic tunable filter 202 can lead through the heat equivalent circuit shown in FIG. 16 with each element of the package construction taken into account as heat resistance. That is, the heat conductivity is assumed to be obtained by connecting in parallel between current source I and external air Ta serially connected heat resistance RLN0i on the nearly center side of LiNbO3 substrate 204 and upper air resistance Rair0 on the nearly center side to serially connected heat resistance RLN1 on the edge side of LiNbO3 substrate 204 and upper air resistance Rair1 on the edge side connected in series.

Following equations hold:

$$Th0 = i0 \cdot Rair0 = R1 \cdot I \cdot Rair0 / (R1 + R0) = \Delta T \quad (1)$$

$$R1 = RLN1 + Rair1 \quad (2)$$

$$R0 = RLN0 + Rair0 \quad (3)$$

$$\therefore I = (R1 + R0) \cdot \Delta T / R1 / Rair0 \quad (4)$$

$$\Delta Ts = Th0 - Th1 \quad (5)$$

$$= i0 \cdot Rair0 - i1 \cdot Rair1$$

$$= I \cdot (R1 \cdot Rair0 - R0 \cdot Rair1) / (R0 + R1) \quad (6)$$

$$\Delta Ts = \Delta T \cdot (1 - (R0 \cdot Rair1) / (R1 \cdot Rair0)) \quad (7)$$

where, Th0 is the temperature of the substrate 204 at the center, Th1 is the temperature of the substrate 204 at the circumference, and $\Delta T$ is temperature difference from the outside.

Patent literature 1: Japanese Patent Application Laid-Open Publication No. 2001-330811.
Patent literature 2: Japanese Patent Application Laid-Open Publication No. H8-146369.
Patent literature 3: Japanese Patent Application Laid-Open Publication No. H11-326855.
Patent literature 4: Japanese Patent Application Laid-Open Publication No. H9-49994.
Patent literature 5: Japanese Patent Application Laid-Open Publication No. 2002-90563.
Patent literature 6: Japanese Patent Application Laid-Open Publication No. 2000-249853.
Nonpatent literature 1: Optorics (1999) No. 5, P155.
Nonpatent literature 2: The Institute of Electronics, Information and Communication Engineers, OPE 96-123, P79.
Nonpatent literature 3: Optical Waves in Crystal, AMNON YARIV, A Wiley-Interscience Publication, P137.

However, the various techniques are described in patent literature 1 through 4 only to improve the characteristics as a simple AOTF device and they do not consider thermal measures when AOTF is modularized, and they cannot solve problems in multichanneling in which a plurality of AOTFs are positioned on one LiNbO3 substrate.

To describe the detail, it is known that in AOTF device, filter characteristics degrade when the temperature distribution is present on the SAW guide surface. The filter characteristics are assumed to be degraded because stress is applied nonuniformly due to temperature distribution, crystal strain by acoustic effects becomes nonuniform, and the relation of microscopic ½ wavelength plate to the specific wavelength excited by SAW is broken down. Consequently, it becomes a big problem how to keep the temperature in the SAW guide uniformly. Furthermore, when multichanneling is achieved, not only the device length but also the width increase, and uniformity of temperature on the device surface causes still more difficult problems.

The configuration to have a soaking plate to AWG is a generally adopted technique as disclosed in patent literature 5, 6, but because in the AOTF device, the device area is large, there is a problem that a temperature gradient is generated due to the temperature gradient of the heater itself, the difference of heat resistances of air on the device surface, etc., and the desired temperature uniformity cannot be obtained with the soaking plate only. The temperature cannot be made uniform by the configuration in which the soaking plate is simply placed on the Peltier element and effects from the outside cannot be eliminated. By the way, when the soaking plate is formed by material with good thermal conductivity, the power consumption of the Peltier element increases.

In this way, since the device area is large with the conventional AOTF device, there is a problem that a temperature gradient is generated due to the temperature gradient of the heater itself, difference of heat resistances of air on the top of the device, etc. and there is a problem that the desired temperature uniformity cannot be obtained by the soaking plate adopted by the conventional technology.

In addition, when the AOTF device is multichanneled, installation of signal wiring to an inter-digital transducer (IDT) becomes an important problem, but in the waveguide device, forming a grand pattern with large area in order to facilitate installation of signal wiring, the light is absorbed by the large-area metal patterns and loss increases. Consequently, installation of signal wiring by fine-line patterns as shown in FIG. 14 becomes necessary. Since by signal wiring installation by this fine-line pattern, line with 50-Ω characteristic impedance cannot be designed, signal patterns become all inductance components, giving rise to problems of degraded RF signals applied and generation of cross-talks between adjacent signal patterns, too. In addition, another problem that the device area increases to secure a signal wiring installation region occurs.

SUMMARY OF THE INVENTION

It is an object of the present invention to solve at least the problems in the conventional technology.

An optical device module according to one aspect of the present invention includes an optical device with a plurality of electrodes disposed at predetermined positions; a substrate disposed oppositely to the optical device and with wiring patterns for connecting to the electrodes; and a wiring which connects the electrodes to the wiring patterns.

The other objects, features, and advantages of the present invention are specifically set forth in or will become apparent from the following detailed description of the invention when read in conjunction with the accompanying drawings.

DETAILED DESCRIPTION

Exemplary embodiments of an optical device module related to the present invention will be described in detail below by referring to the accompanying drawings. In each embodiment discussed as follows, cases when LiNbO3 waveguide type acousto-optic tunable optical filter (AOTF) as a waveguide type optical device is applied as one example of the device.

Figure 1:
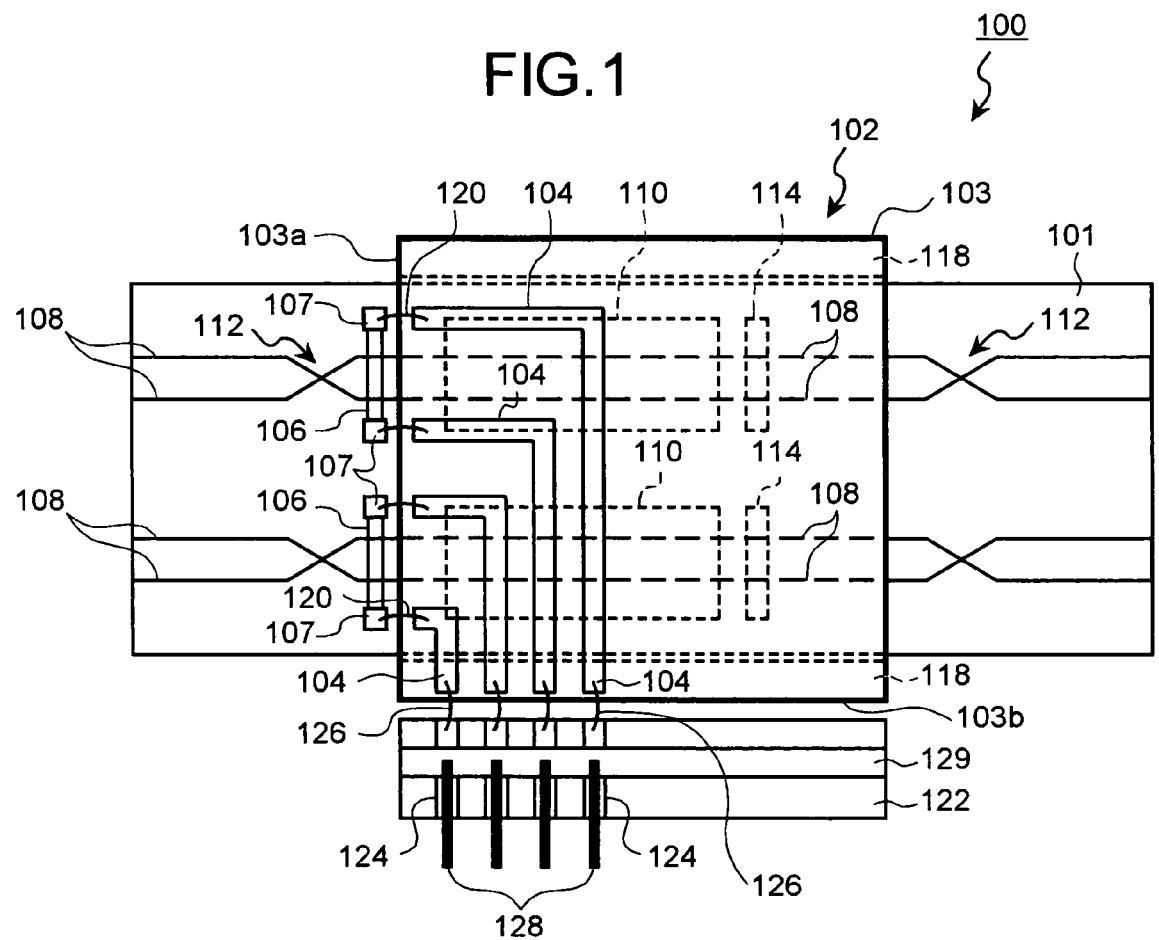
FIG. 1 is a top view of essential portions of a module construction of the optical filter related to a first embodiment.
Figure 2:
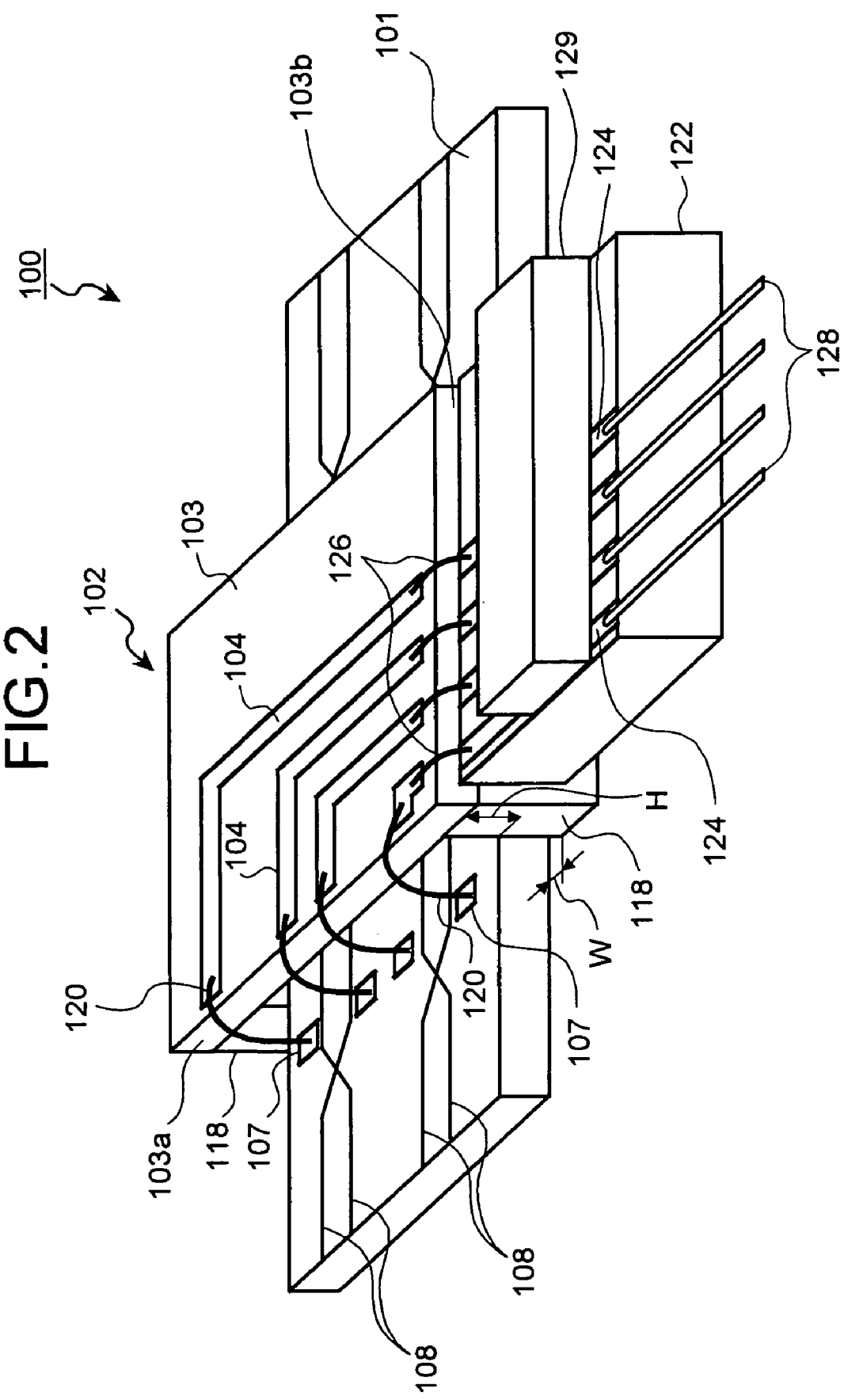
FIG. 2 is a perspective view of essential portions of a module construction of the optical filter related to the first embodiment.

FIG. 1 is a top view of the essential portions of a module construction of the optical filter related to the first embodiment, and FIG. 2 is a perspective view of the essential portions of the relevant module construction.

An optical filter 100 comprises an optical waveguide 108 formed on an X-cut LiNbO3 substrate 101 by Ti diffusion, an inter-digital transducer (IDT) 106 that generates acoustic waves, a polarization beam splitter (PBS) 112, a SAW guide 110, and an absorber 114 that absorbs surface acoustic wave (SAW).

A soaking structure 102 is disposed on the LiNbO3 substrate 101. Bridge substrates (substrates) 103 which compose the soaking structure 102 are disposed oppositely on the surface of the LiNbO3 substrate 101 with specified intervals (spaces). Each the bridge substrate 103 is made of ceramics and the specified metals and is formed in a flat plate shape, and covers a wide area (at least, including the inter-digital transducer 106 for each channel, the optical waveguide (optical path) 108 for each channel, the SAW guide 110, and the absorber 114). The top surface of the LiNbO3 substrate 101 and the bottom surface of the the bridge substrate 103 have, for example, about 0.5 millimeter (mm) to 2 mm gap, which is the specified interval (space) H.

The position of an end face 103a on the left side of the illustration of the bridge substrate 103, that is, the position of the end face on the headed side of input side of incoming light, is set to be a position slightly towards the right from each electrode 107 to expose each electrode (a plurality of electrodes) of the inter-digital transducer 106 for each channel to cover the absorber 114. The position of the end face on the right side of the illustration in the bridge substrate 103 is set to become a position rightward from the absorber 114. The positions of the end faces at the top and the bottom of the illustration in the bridge substrate 103 are set to be the positions outside from the breadth of the LiNbO3 substrate 101.

On the top surface as one surface of the bridge substrate 103, an end face 103b at the lower part of the illustration, that is, a plurality of wiring patterns 104 layout-wired from one end face which falls under the input side of high-frequency signals from a signal output means not illustrated, is formed by vacuum deposition technique, etching technique, etc. The wiring patterns 104 are made into signal lines of, for example, 50-Ω characteristic impedance, by micro strip line, coplanar line, grounded coplanar line, etc. The head end of each wiring pattern 104 is directed to the end face 103*a* on the right side of the illustration and at the same time, establishes a positional one-to-one relation with each electrode 107 of the inter-digital transducer for each channel. By providing the wiring pattern 104 on the bridge substrate 103, installation of wiring on the LiNbO3 substrate 101 is no longer required. In addition, by the use of the region on the bridge substrate 103, the wiring pattern 104 can be freely designed. The bridge substrate 103 can be used as the substrate for the wiring pattern 104 from the electrical viewpoint and the strip lines, etc. can be easily formed, and high-density wiring can be carried out, too, with characteristic impedance maintained.

In each wiring pattern 104, to each head end side hanging over the end face 103*a* of the bridge substrate 103 on the left side of the illustration, one end of connecting energizing cable (wiring) such as wire, etc. is connected, respectively. To the other end of a connecting energizing cable 120, each electrode 107 of the inter-digital transducer 106 for each channel is connected, respectively, in one-to-one relation. Connection of each connecting energizing cable 120 is enabled by the use of bonding technique, soldering technique, vacuum deposition technique, etc., but any optional method may be used for the connecting method. Each wiring pattern 104 includes signal lines which outputs high-frequency signals to the inter-digital transducer 106 for every channel as well as ground lines. Because by this construction, signal wiring can be freely installed with characteristic impedance maintained, no signal degradation occurs and generation of cross-talks between adjacent signals can be avoided. In addition, because the wiring pattern 104 is formed on the bridge substrate 103, high-density wiring has been enabled, and even when multichanneling is achieved, this can prevent the area for wiring installation on the LiNbO3 substrate 101, waveguide device from increasing.

The bridge substrate 103 have both top and bottom illustrated end sides of the bottom surface, that is, both end sides which are parallel to the incoming light advancing direction joined to a side wall plate 118 formed into a flat-plate shape with the total length that coincides with the total length of the relevant both ends using ceramics that compose the other part of the soaking structure 102 or a specified metal, etc. The bridge substrate 103 and the side wall plate 118 may be of an integral construction. According to the height of the side wall plate 118, there is, for example, about 0.5 mm to 2 mm predetermined interval (space) W between the LiNbO3 substrate 101 and the outer bottom surface (inner surface) of the bridge substrate 103.

In addition, on the end face 103*b* side of the bridge substrate 103, a lead-through block 122 which is slightly lower than the installation height of the bridge substrate 103 and made of ceramics is installed. On the lead-through block 122, a plurality of wiring patterns 124 are formed, and the head end side of each of them is connected to the head end side of each wiring pattern 104 layout-formed on the bridge substrate 103 via the connection energizing cable (wiring) 126 such as wires, etc. in the one-to-one relation.

In addition, to the other head end side of each wiring pattern 124 on the lead-through block 122, a lead wire 128 which communicates with a signal output means not illustrated is connected. In addition, on the top surface of the lead-through block 122, an insulator 129 comprising ceramics, etc. is disposed for protecting each wiring pattern 124. By the way, the lead-through block 122 is one example of secondary element for supplying high-frequency signals, etc. to each wiring pattern 104 on the bridge substrate 103, and shall not be limited to the illustrated configuration and a lead-through block which is configured as required from time to time optionally should be used.

Figure 3:
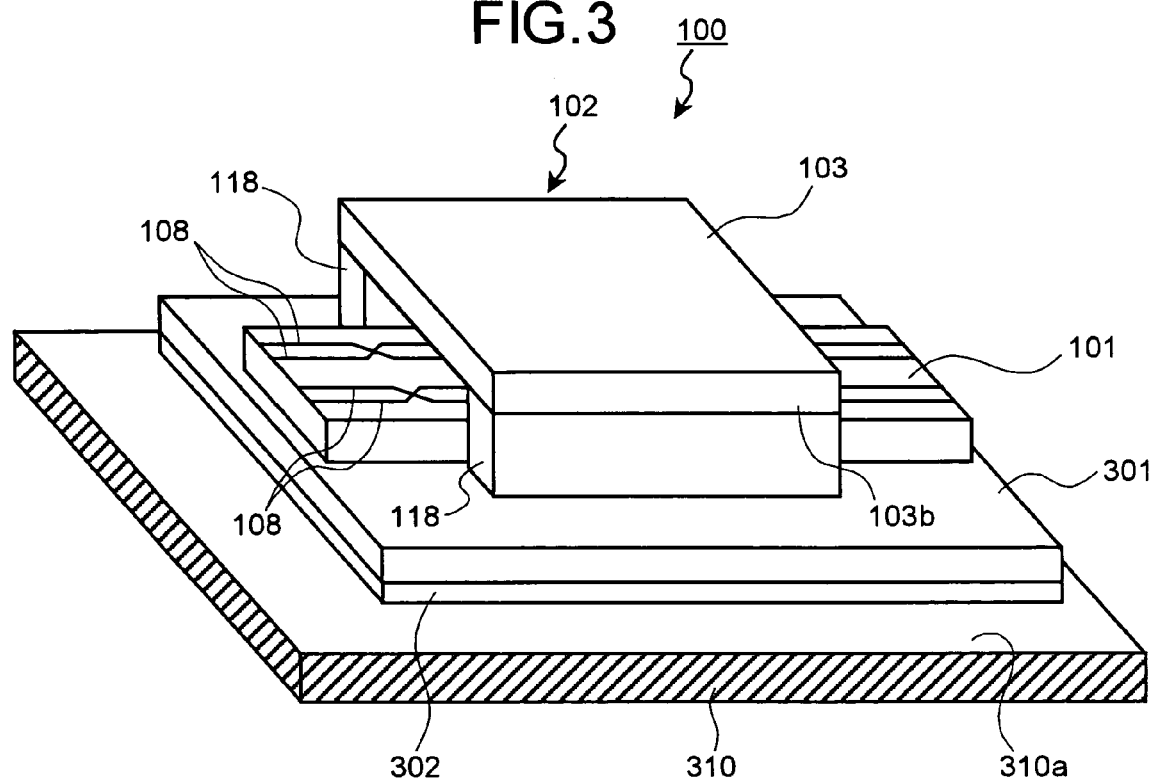
FIG. 3 is a perspective view of a module construction related to the first embodiment.

A discussion will be made on homogeneity of temperature on device surface in the above configuration. FIG. 3 is a perspective view of the module construction related to the first embodiment and FIG. 4 is an illustration which describes heat resistance of module construction.

In FIG. 3, wiring patterns on the bridge substrate 103 are omitted. The soaking structure 102 in the first embodiment intends to store the LiNbO3 substrate 101 between both the side wall plates 118 and at the same time fix the side wall plate 118 to a soaking plate 301. When the bridge substrate 103 and the side wall plate 118 which compose the soaking structure 102 are disposed on the soaking plate 301, for example, about 0.5 mm to 2 mm predetermined interval (space) must be provided between both side surfaces of the LiNbO3 substrate 101, that is, both side surfaces on the side along the incoming light advancing direction and the inner surface of the side wall plate 118 so that the LiNbO3 substrate 101 does not come in direct contact with the side wall plate 118. Reference numeral 302 in the drawing denotes a heater, 310 a package, and 310*a* the inner bottom surface of the package 310.

Figure 4:
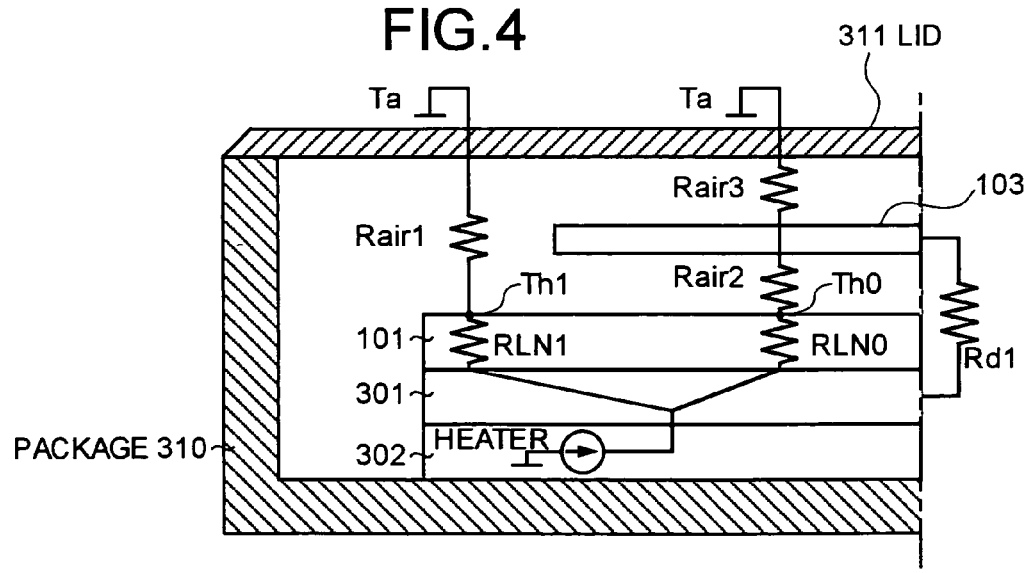
FIG. 4 is to explain the heat resistance of the module construction related to the first embodiment.

As shown in FIG. 4, heat resistance includes heat resistance RLN0, RLN1 by the LiNbO3 substrate 101, heat resistances Rair1, Rair2, Rair3 of air of each region, heat resistance Rd1 between the soaking plate 301 and the bridge substrate 103, or heat resistance Rd1 between package 310 with high heat conductivity and the bridge substrate 103. By the way, reference numeral 311 denotes a lid that covers an opening on the top surface of package 310.

Figure 5:
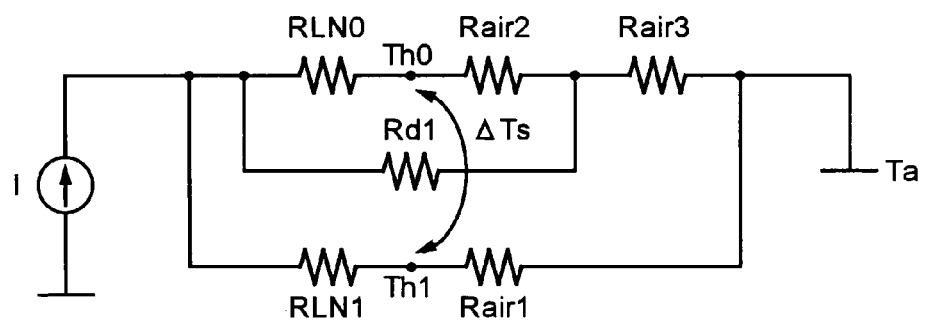
FIG. 5 is a heat equivalent circuit diagram of the module construction related to the first embodiment.

FIG. 5 is a heat equivalent circuit of module construction related to the first embodiment. It is assumed as a heat equivalent circuit in which the heat resistance RLN0 of LiNbO3 substrate and heat resistance Rair2 below the bridge substrate 103 are connected in series, to which Rd1 is connected in parallel, and they are then connected to Rair3 in series, to which heat resistance RLN1 of the LiNbO3 substrate 101 and heat resistance Rair1 of air outside bridge substrate connected in series are connected in parallel between current source I and external air Ta.

As described above, conventionally, due to factors such as heat resistance difference of the LiNbO3 substrate 101 (difference between the heat resistances RLN0 and RLN1), heat resistance difference of air layer from the LiNbO3 substrate 101 to the lid 311 which serves as a top surface of package 310 (difference between the heat resistances Rair0 and Rair1), etc., a temperature gradient ΔTs is generated between the temperature Th0 on the center side of LiNbO3 substrate and the temperature Th1 on the edge side (that is end face side). That is, $$R1 = RLN1 + Rair1 \qquad (2)$$

$$R0 = RLN0 + Rair0 \qquad (3)$$

$$\Delta Ts = \Delta T \cdot (1 - (R0 - Rair1)/(R1 \cdot Rair0)) \qquad (7).$$

To make the temperature gradient ΔTs zero, the heat resistances RLN0, RLN1 of the LiNbO3 substrate 101 and the heat resistance Rair2 of the air must be brought to complete agreement. However, since the area, etc. in contact with the soaking plate 301 differ, it is, in principle, impossible to bring the heat resistance on the center side of the LiNbO3 substrate 101 in agreement with that on the edge side. This is similar to the phenomenon in the parallel flat plate capacitors in which the capacitance at the edge differs from that at the center due to the edge effect.

However, it becomes possible to control (adjust) the temperature Th0 on the center side of the LiNbO3 substrate 101 by covering the center section of the LiNbO3 substrate 101 with the bridge substrate 103 and fixing the bridge substrate 103 by metal material with small heat resistance on the soaking plate 301 as per the above configuration according to the first embodiment of the present invention. In FIG. 5, the heat resistance Rd1 between the soaking plate 301 and the bridge substrate 103 is small and the heat resistance RLN0 of the LiNbO3 substrate 101 and the heat resistance Rair2 of the air below the bridge substrate 103 can be made seemingly small, and the temperature Th0 on the center side of the LiNbO3 substrate 101 can be increased.

That is, when Th0<TH1, by fixing the bridge substrate 103 to the soaking plate 301, the temperature Th0 on the center side increases, and by appropriately setting the heat resistance Rair3 of the air on the bridge substrate 103 and the heat resistance Rd1 between the soaking plate 301 and the bridge substrate 103, Th0=Th1 (temperature gradient ΔTs=0) can be achieved.

In the first embodiment, the bridge substrate 103 is used, and by fixing the bridge substrate 103 to the soaking plate 301, the temperature Th0 can be raised when temperature on the center side of the LiNbO3 substrate 101 is low, and a temperature gradient on LiNbO3 substrate 103 is eliminated, and the surface temperature can be kept uniformly throughout the whole surface. In addition, because the wiring pattern 104 is formed on the bridge substrate 103, line design (layout design) to bring the characteristic impedance of the wiring pattern 104 to 50Ω can be easily carried out, and it becomes possible to prevent signal degradation and generation of cross-talks, and multichanneling can be promoted.

Figure 6:
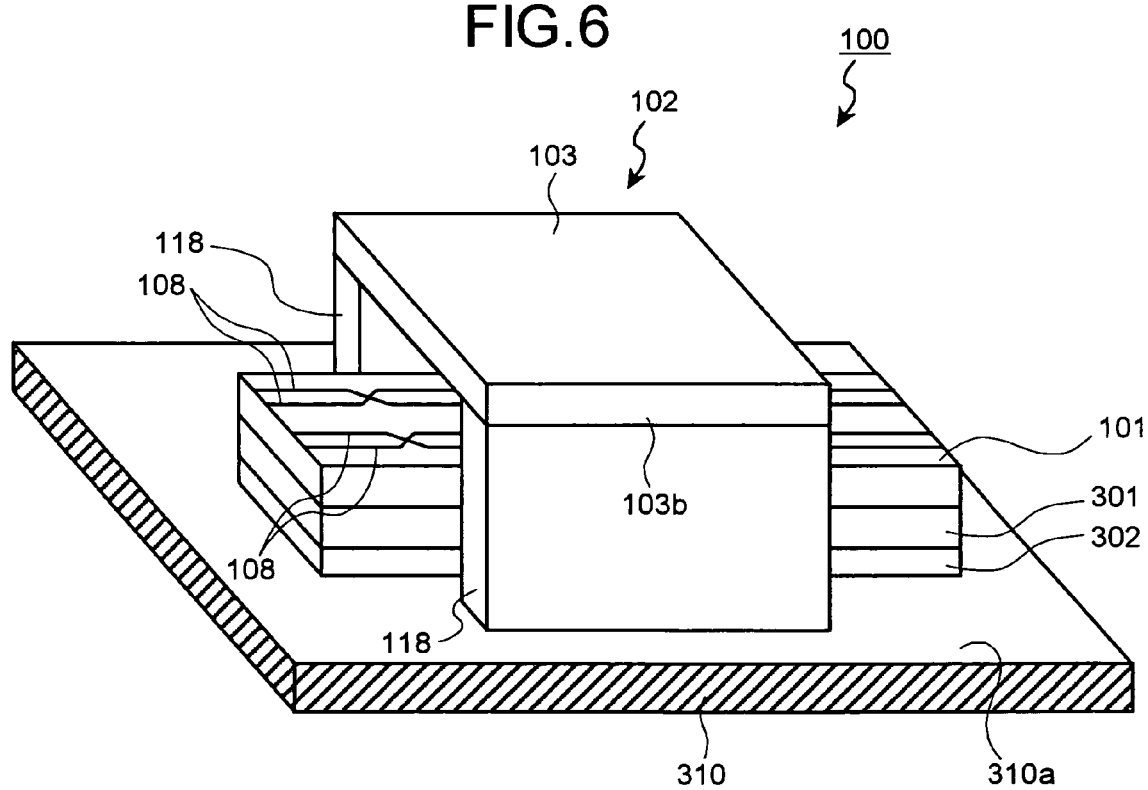
FIG. 6 is a perspective view of a module construction related to a second embodiment.

Next, an optical filter related to a second embodiment will be explained. The second embodiment is nearly same as the first embodiment with the exception that the bridge substrate is fixed to the package. FIG. 6 is a perspective view of a module construction related to the second embodiment. Elements similar to those of the first embodiment are given like reference numerals. For convenience, the description of the lead-through block 122 is omitted.

In the second embodiment, the LiNbO3 substrate 101 is housed between the side wall plates 118 and disposed and fixed to the inner bottom surface 310a of the package 310. On the inner bottom surface 310a of the package 310, the heater 302, the soaking plate 301, and the LiNbO3 substrate 101 are laminated in that order from the bottom. Even when the bridge substrate 103 is fixed to the package 310 in this way, it must be arranged in such a manner that, for example, about 0.5 mm to 2 mm predetermined intervals (spaces) must be provided between both side surfaces (and the heater 302 and soaking 301) on the side along the incoming light advancing direction and between each side wall plate 118 and the inner surface.

By covering the center section of the LiNbO3 substrate 101 with the bridge substrate 103 and fixing the bridge substrate 103 onto the package 310 with a metal material with small heat resistance, it becomes possible to control (adjust) the temperature Th0 on the center side of the LiNbO3 substrate 101. In the second embodiment, too, same as FIG. 4, description will be made with primary emphasis placed on the heat resistance of each section in the module construction.

Figure 7:
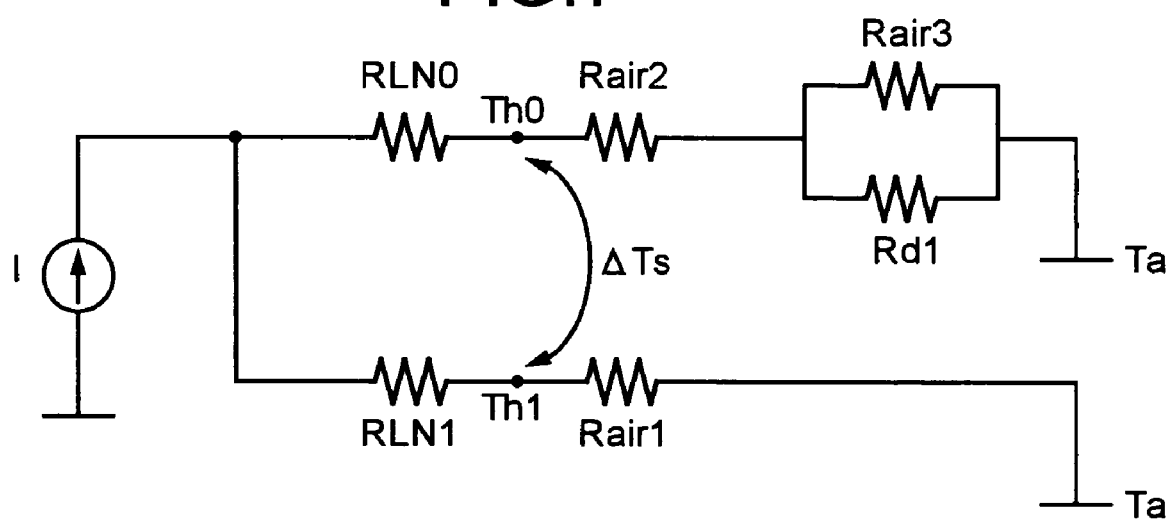
FIG. 7 is a heat equivalent circuit diagram of the module construction related to the second embodiment.

FIG. 7 is a heat equivalent circuit diagram of the module construction related to the second embodiment. Rd1 is a heat resistance between the package 310 and the bridge substrate 103. The heat resistance Rd1 is small and it is possible to indicate the heat resistance Rair0 (Rair2, Rair3 in FIG. 7) from the LiNbO3 substrate 101 to the lid 311 (not shown), which serves as the top surface of the package 310 seemingly small, and to lower the temperature Th0 at the center side of the LiNbO3 substrate 101.

That is, when Th0>Th1, by fixing the bridge substrate 103 to the inner bottom surface 310a of the package 310, which has high heat conductivity, the temperature Th0 can be lowered and by properly setting the heat resistance Rair2 of the air below the bridge substrate 103 and the heat resistance Rd1 between the package 310 and the bridge substrate 103, it becomes possible to achieve Th0=Th1 (temperature gradient ΔTs=0).

In the second embodiment, by fixing the bridge substrate 103 to the package 310, the temperature Th0 can be lowered when the temperature on the center side of the LiNbO3 substrate 103 is high, and a temperature gradient on the LiNbO3 substrate 101 can be eliminated, and the surface temperature can be maintained uniformly. In addition, because the wiring pattern 104 is formed on the bridge substrate 103, it is possible to easily design the line (design the layout) with 50Ω characteristic impedance of the wiring pattern 104, and at the same time, it is possible to prevent signal degradation as well as to prevent generation of cross-talks, and thereby to promote multichanneling.

Next, an optical filter related to a third embodiment will be explained. The third embodiment intends to cancel the temperature gradient of the LiNbO3 substrate in the configuration in which optical waveguides that compose the AOTF filter on LiNbO3 substrate are connected in series in a plurality of stages in order to improve the filter characteristics. Configurations similar to the first embodiment are given like reference numerals.

Figure 8:
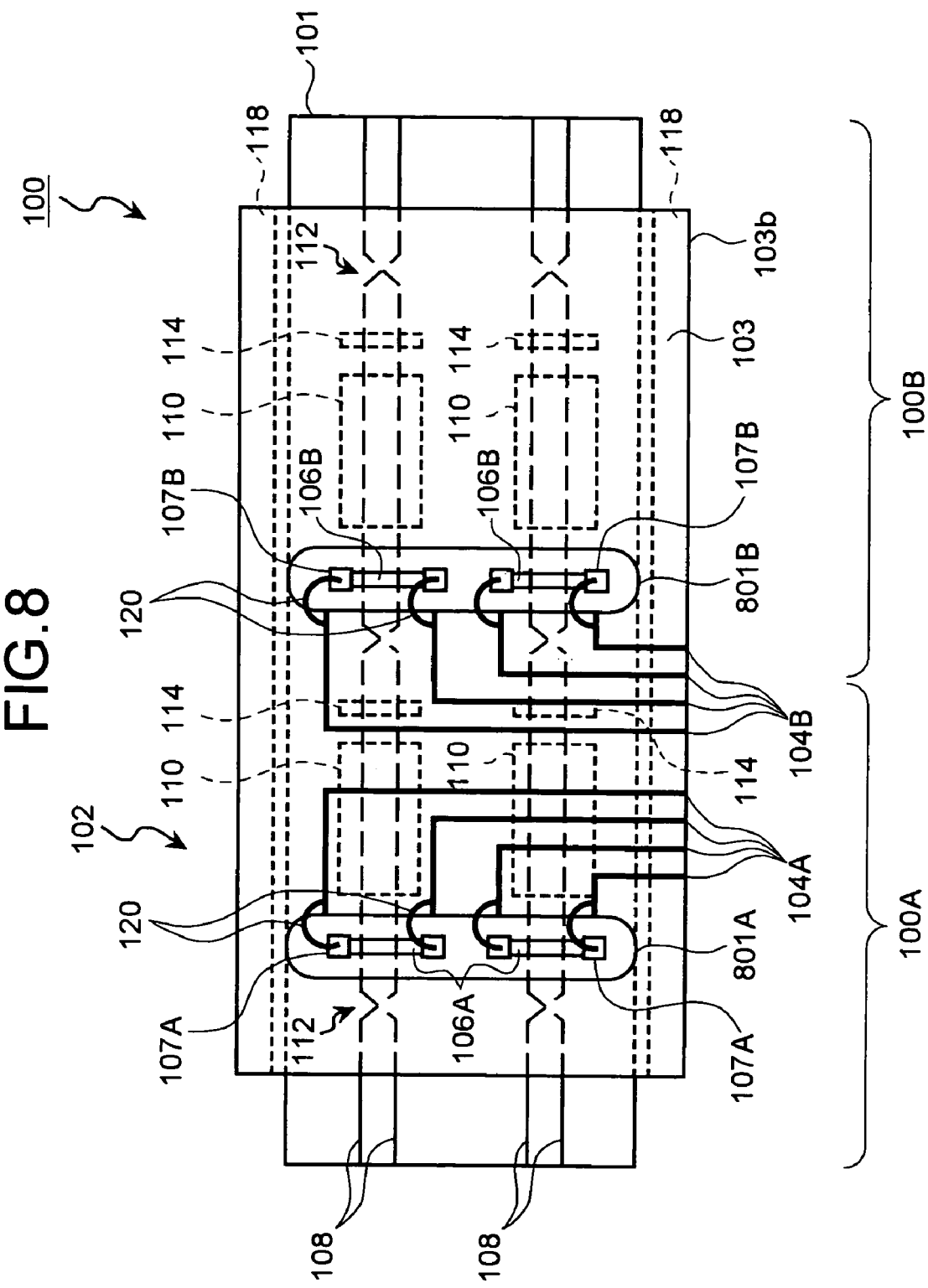
FIG. 8 is a top view of essential portions of a module construction of the optical filter related to a third embodiment.

FIG. 8 is a top view of the essential portions of the module construction of optical filter related to the third embodiment. The optical filter 100 includes an optical filter 100A on the preceding step connected in series to an optical filter 100B on the latter stage of the similar configuration. Optical output of the optical filter 100A is input into the optical filter 100B. The optical filter 100A comprises an inter-digital transducer 106A, the optical waveguide (optical path) 108, the SAW guide 110, the absorber 114, the polarization beam splitter 112, etc. The optical filter 100B comprises an inter-digital transducer 106B, the optical waveguide (optical path) 108, the SAW guide 110, the absorber 114, the polarization beam splitter 112, etc. By the way, in the configuration example shown in FIG. 8, optical filters of other channels arranged in parallel at the upper and lower positions in the drawing are connected in series in the same manner (2 channels in total).

On the surface of the LiNbO3 substrate 101, the bridge substrate 103 which composes part of the soaking structure 102 is arranged oppositely with a predetermined interval (space) provided. This bridge substrate 103 covers a wide range including the optical waveguide (optical path) 108, the inter-digital transducer 106, the SAW guide 110, and the absorber 114 for each channel formed on the LiNbO3 substrate 101. Between above the surface of the LiNbO3 substrate 101 and the bottom surface of the bridge substrate 103, the interval same as that of the first embodiment is provided (for example, about 0.5 mm to 2 mm).

And in the bridge substrate 103, elongated openings 801A, 801B which enable the electrodes 107A, 107B of each channel to be seen en bloc are formed near right and left edges, that is, near the edges corresponding to the direction before and after the incoming light advancing direction and at the position right above each electrode (a plurality of electrodes) 107A, 107B of the inter-digital transducer for every channel.

On the top surface of the bridge substrate 103, wiring patterns 104A, 104B are formed by vacuum deposition techniques, etching techniques, etc. with the end face 103*b* used as one end same as in the first embodiment. The other end of the wiring pattern 104A is bent and led through in the left direction in the figure in the midway towards the opening 801A for the optical filter 100A of the preceding step, while the other end of the wiring pattern 104B is bent and led through in the right direction in the drawing in the midway towards the opening 801B for the optical filter 100B of the latter step. Each electrode 107A, 107B of the inter-digital transducers 106A, 106B for each channel and other end of each wiring pattern 104A, 104B are connected by connection energizing cable 120 such as wire, etc. via the openings 801A, 801B.

The soaking structure 102 can be disposed in two ways: fixed on the soaking plate 301 (see FIG. 3) as described in the first embodiment or the second embodiment and fixed on the inner bottom surface 310*a* of the package 310 (see FIG. 6). How to dispose the soaking structure 102 can be chosen based on the relation between the temperature Th0 on the center side of the LiNbO3 substrate 101 and the temperature Th1 on the end side (that is, end face side).

In the third embodiment, when optical filters are multi-channeled by serial connection or parallel arrangement of a plurality of channels, electrical connection can be easily carried out by providing the openings 801A, 801B for the signal connection sections only, in addition to the effects described in the first and the second embodiments that the temperature of the LiNbO3 substrate 101 can be homogenized and signal loss can be reduced, and others. By this, it is possible to form the wiring patterns 104A, 104B on single the bridge substrate 103 for each of the electrodes 107A, 107B of the inter-digital transducers 106A, 106B disposed in the optical filters 100A, 100B arranged in series or in parallel, and improve the packaging capability, and requirements for multichanneling can be easily responded.

Figure 9:
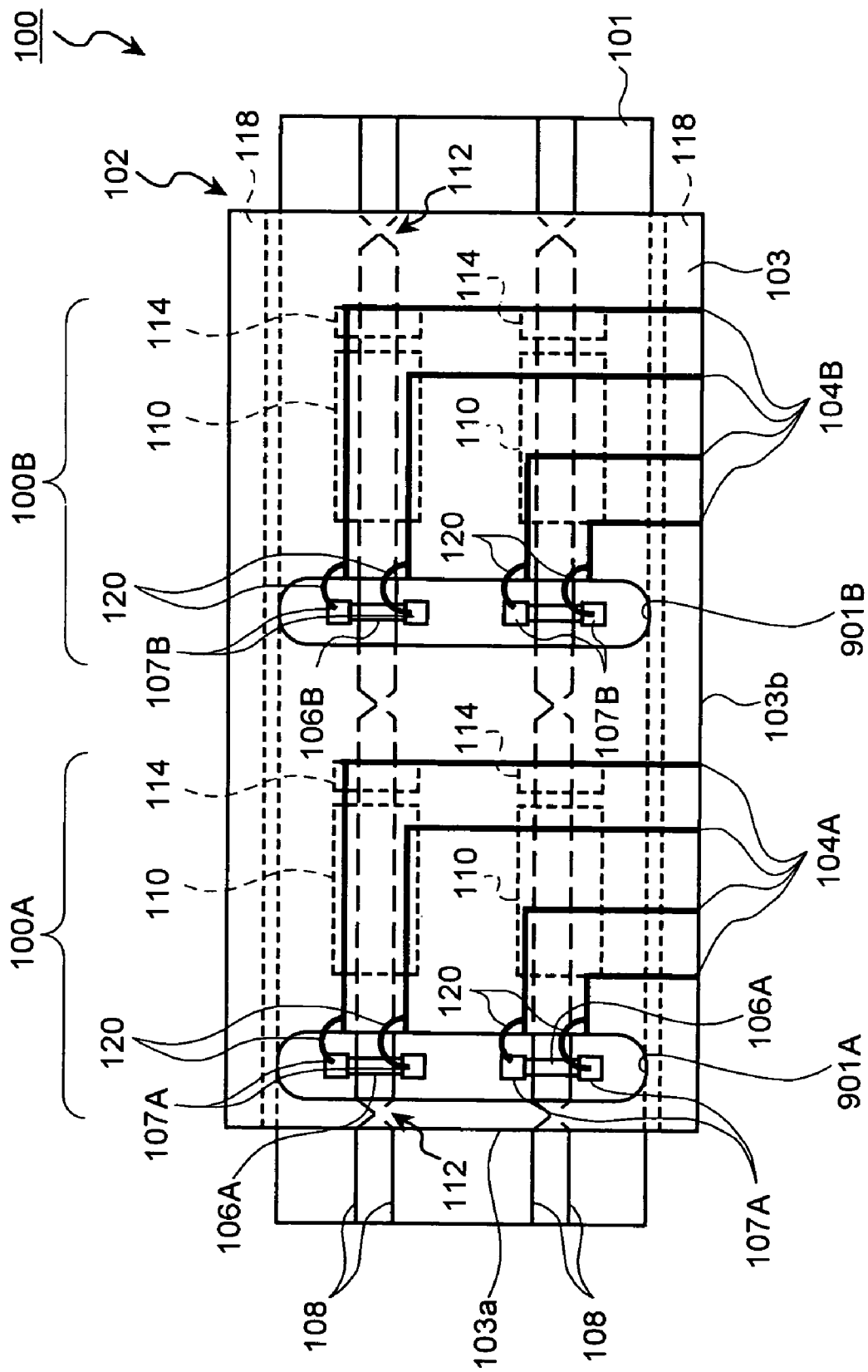
FIG. 9 is a top view of a configuration of essential portions of a module construction of the optical filter related to a fourth embodiment.

Now, an optical filter related to a fourth embodiment will be explained. FIG. 9 is a top view of the configuration of the essential portions of the module construction of an optical filter related to the fourth embodiment. The fourth embodiment differs from the third embodiment in the shape of the bridge substrate 103 which composes the soaking structure 102, and the configuration of optical filter 100 is the same as that of the third embodiment and the detailed description will be omitted.

The optical filter 100 has the optical filter 100A on the preceding step connected in series to the optical filter 100B on the latter stage of the similar configuration, and optical output of the optical filter 100A is input into the optical filter 100B.

On the surface of the LiNbO3 substrate 101, the bridge substrate 103 which composes part of the soaking structure 102 is arranged oppositely with a predetermined interval (space) provided. This bridge substrate 103 covers a wide range including the optical waveguide (optical path) 108, the inter-digital transducer 106, the SAW guide 110, and the absorber 114 for each channel formed on the LiNbO3 substrate 101.

And in the bridge substrate 103, openings 901A, 901B which enable the electrode 107A, 107B of each channel to be seen en bloc are formed near left edge and at the center position, that is, at the position right above each electrode 107A, 107B of the inter-digital transducer for every channel.

On the top surface of the bridge substrate 103, the wiring patterns 104A, 104B are formed by vacuum deposition techniques, etching techniques, etc. with the end face 103*b* used as one end same as in the first embodiment. The other end of the wiring pattern 104A, 104B are bent and led through in the left direction in the figure in the midway towards the openings 901A, 901B for the optical filters 100A, 100B, respectively. Each electrode 107A, 107B of the inter-digital transducers 106A, 106B for each channel and other end of each wiring pattern 104A, 104B are connected by connection the energizing cable 120 such as wire, etc. via openings 901A, 901B.

The soaking structure 102 has a mode in which it is disposed and fixed to the soaking plate 301 (see FIG. 3) as described in the first embodiment or the second embodiment and a mode in which it is disposed and fixed to the inner bottom surface 310*a* of the package 310 (see FIG. 6). Which mode to be employed is chosen by the relation between the temperature Th0 on the center side of the LiNbO3 substrate 101 and the temperature Th1 on the end side (that is, end face side).

In this way, in the fourth embodiment, too, when the optical filters are multi-channeled by serial connection or parallel arrangement of a plurality of channels, electrical connection can be easily carried out by providing the openings 901A, 901B for the signal connection sections only, in addition to the effects described in the first and the second embodiments, that the temperature of the LiNbO3 substrate 101 can be homogenized and signal loss can be reduced, and others. By this, it is possible to form the wiring patterns 104A, 104B on single the bridge substrate 103 for each of the electrodes 107A, 107B of the inter-digital transducers 106A, 106B disposed in the optical filters 100A, 100B arranged in series or in parallel, and improve the packaging capability, and requirements for multichanneling can be easily responded. When wiring patterns are compared between the third embodiment and the fourth embodiment, in the end face 103*b* section of the bridge substrate 103, in the third embodiment, all the wiring patterns 104A, 104B can be brought together, while in the fourth embodiment, the wiring pattern 104A for the optical filter 100A of the preceding step and the wiring pattern 104B for the optical filter 100B of the latter step connected in series can be separated and arranged.

Next, an optical filter related to a fifth embodiment will be described. The configuration of the fifth embodiment is to separate the bridge substrate 103 which composes the soaking structure 102 when multi-channeling is carried out.

Figure 10:
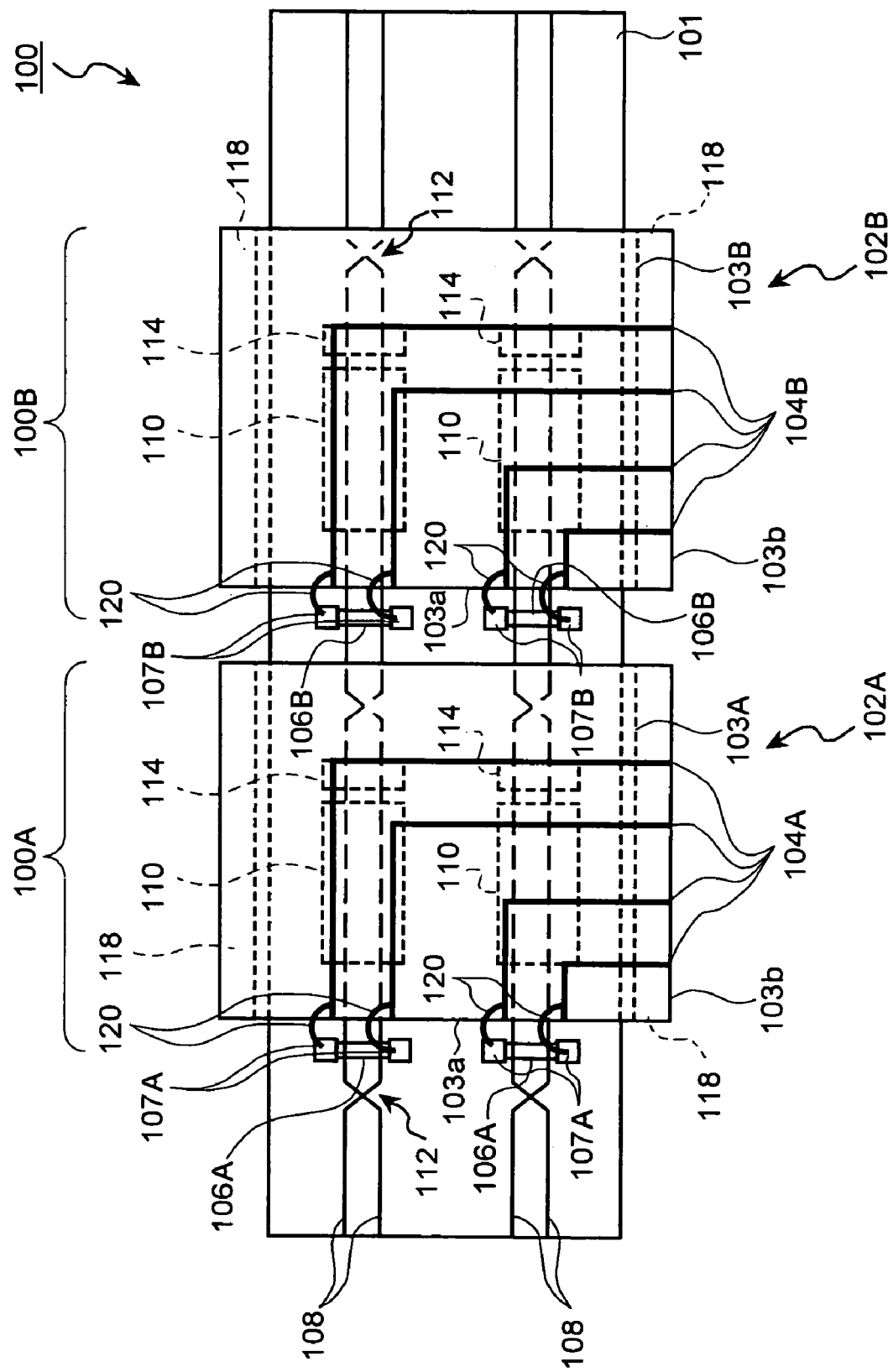
FIG. 10 is a top view of a configuration of essential portions of a module construction of the optical filter related to a fifth embodiment.

FIG. 10 is a top view of the configuration of the essential portions of the module structure of an optical filter (ADTF) related to the fifth embodiment. In the fifth embodiment, the soaking structure is divided (in other words, two soaking structures are provided) nearly at the center position as compared to the configuration of the fourth embodiment (see FIG. 9). A soaking structure 102A is provided for the optical filter 100A, while a soaking structure 102B is provided for the optical filter 100B. And bridge substrates 103A, 103B which comprise part of soaking structures 102A, 102B of the preceding step and the latter step may have illustrated the end face 103a on the left side, respectively, located at the position slightly rightward from relevant electrodes 107A, 107B so that the electrodes 107A, 107B of the inter-digital transducer 106A, 106B for each channel are exposed. Other reference numerals in the drawing are same as those of each embodiment described above and the explanation will be omitted.

According to the fifth embodiment, same as in the third and the fourth embodiments, when multi-channeling is carried out, temperature can be homogenized at least within the function section of the optical filter and if characteristics degradation caused by the temperature gradient can be avoided, the soaking structure 102 can be divided and installed in units of function sections of this optical filter. By this configuration, the configuration of the soaking structure can be made simple and the manufacturing cost can be suppressed.

Figure 11:
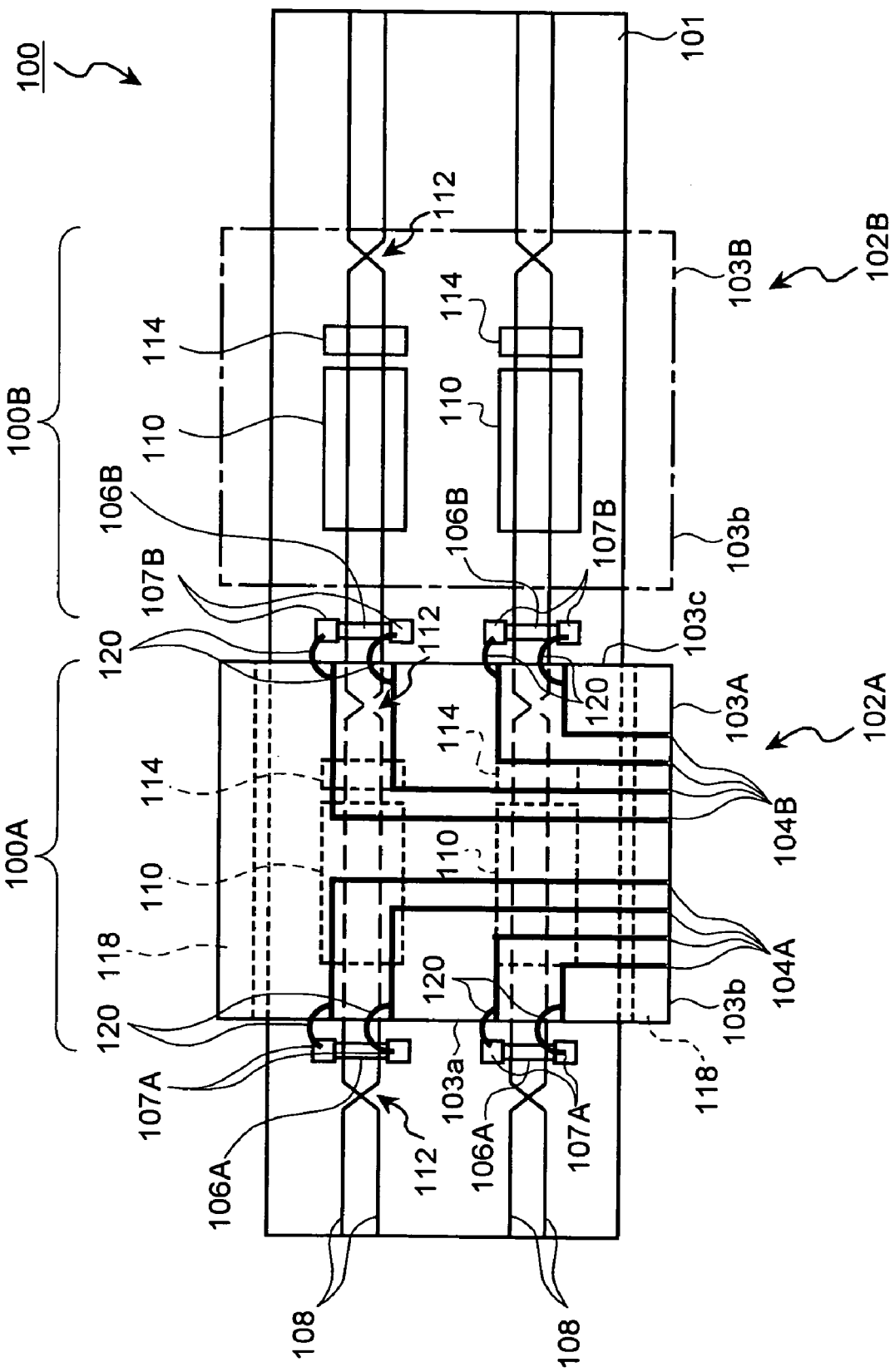
FIG. 11 is a top view of a configuration of essential portions of a module construction of the optical filter related to a sixth embodiment.

Now, an optical filter related to a sixth embodiment will be explained. The configuration of the sixth embodiment is a modification of the fifth embodiment. FIG. 11 is a top view of the configuration of the essential portions of the module construction of the optical filter related to the sixth embodiment.

The position of the end face of illustrated the end face 103a on the left side of the bridge substrate 103A which composes part of the soaking structure 102A is set to be the position slightly rightward from each electrode 107A of the inter-digital transducer 106A of the optical filter 100A. In addition, the position of illustrated end face 103c on the right side of the bridge substrate 103A covers the absorber 114 of the optical filter 100A and the polarization beam splitter 112, and others, and is set to the illustrated position leftward from each electrode 107B of the inter-digital transducer 106B of the optical filter 100B.

And on the soaking structure 102A, the wiring pattern 104A for the optical filter 100A and the wiring pattern 104B for the optical filter 100B are formed. The head end of the wiring pattern 104A is directed to the end face 103a on the left side in the illustration and is patterned to achieve the one-to-one relation with respect to each electrode 107A of the inter-digital transducer 106A for each channel of the optical filter 100A. The head end of the wiring pattern 104B is directed to end face 103c on the right side in the illustration and is patterned to achieve the one-to-one relation with respect to each electrode 107B of the optical filter 100B.

According to the sixth embodiment, when multichanneling is carried out, it is possible to supply signals to the inter-digital transducer 106A, 106B of optical filters 100A, 100B using one one soaking structure 102A. By the way, when temperature homogeneity must be achieved for the optical filter 10B, too, as shown by the dashed line in FIG. 11, the soaking structure 102B which has no wiring patterns and connection energizing cables but other configurations same as those of the soaking structure 102A should be disposed.

Figure 12:
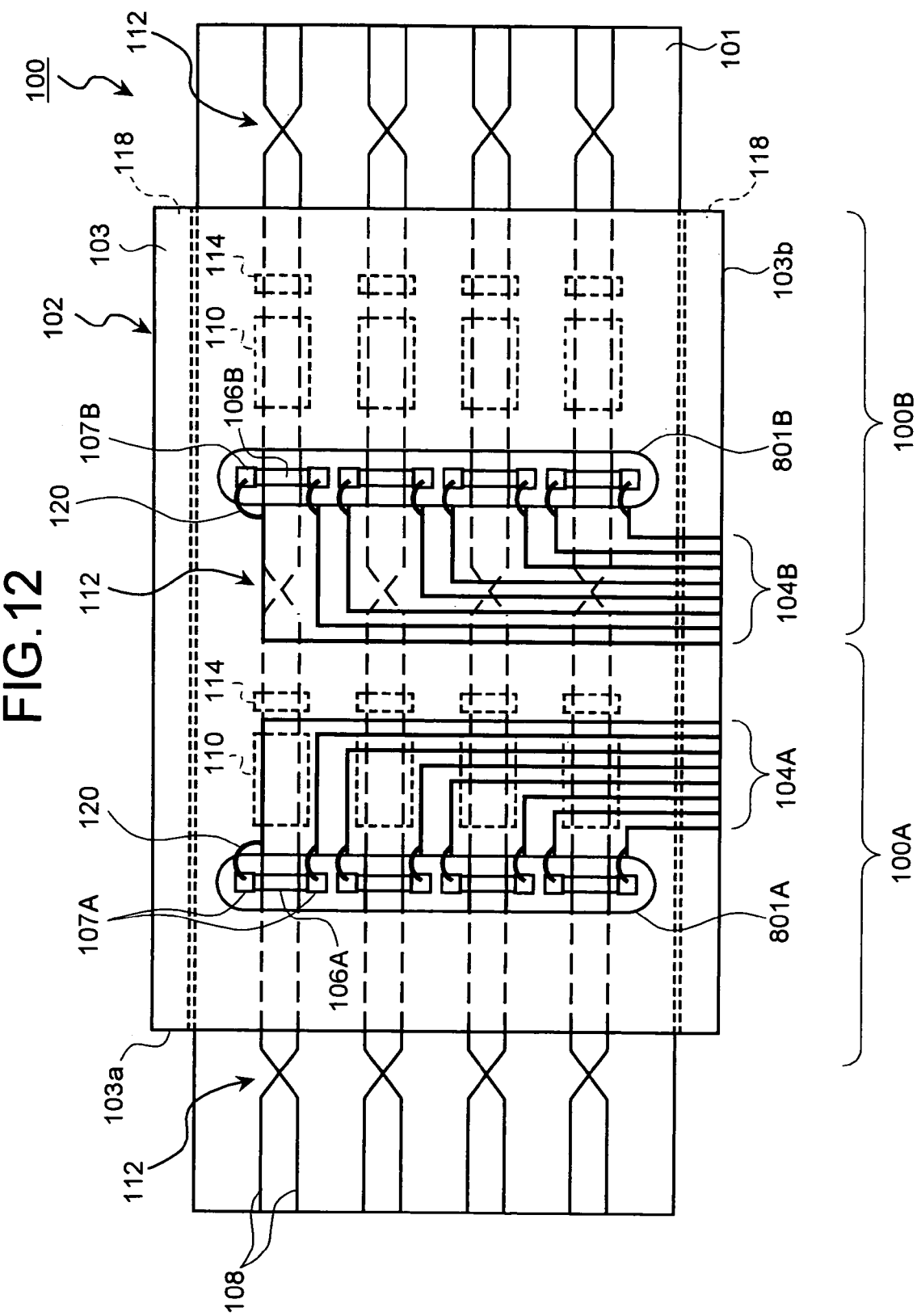
FIG. 12 is a top view of configuration of essential portions of a module construction of the optical filter related to a seventh embodiment.
Figure 13:
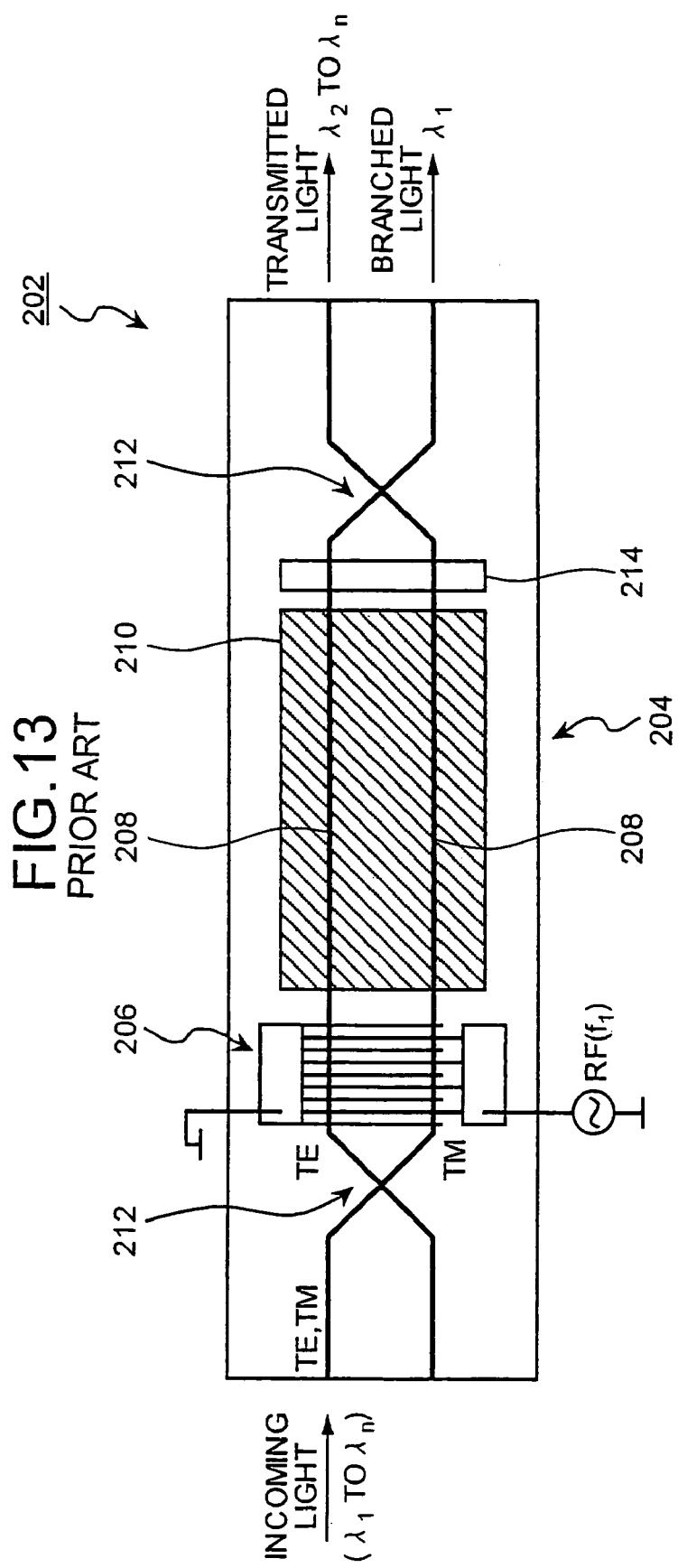
FIG. 13 is a top view of an example of the configuration of conventional optical filter.
Figure 14:
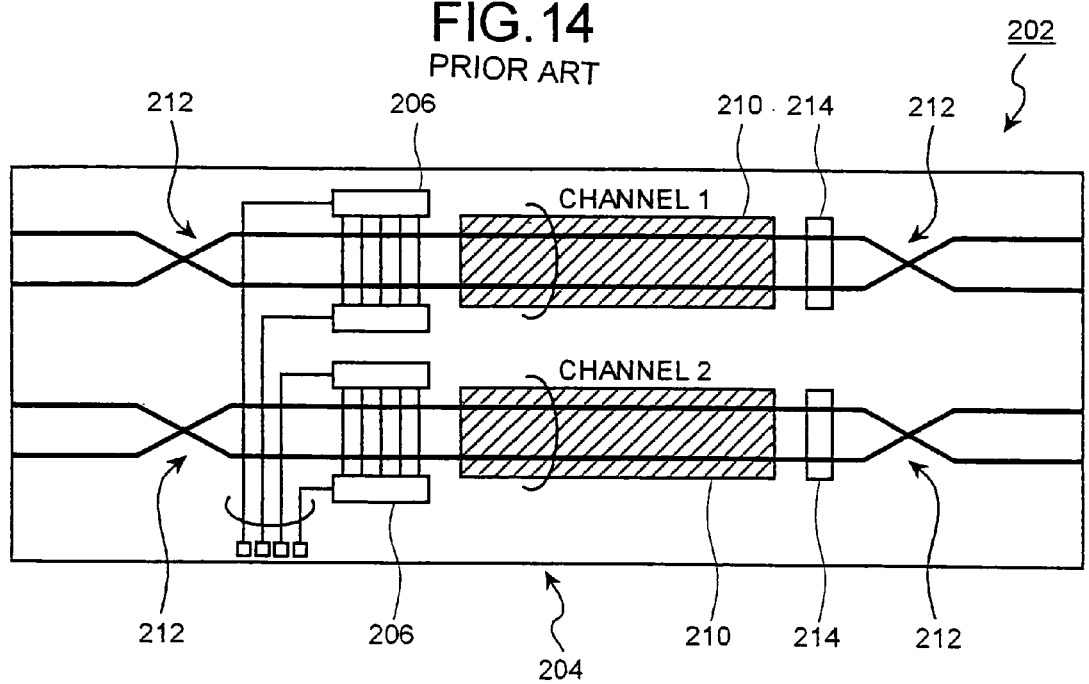
FIG. 14 is a top view of another example of the configuration of conventional optical filter.
Figure 15:
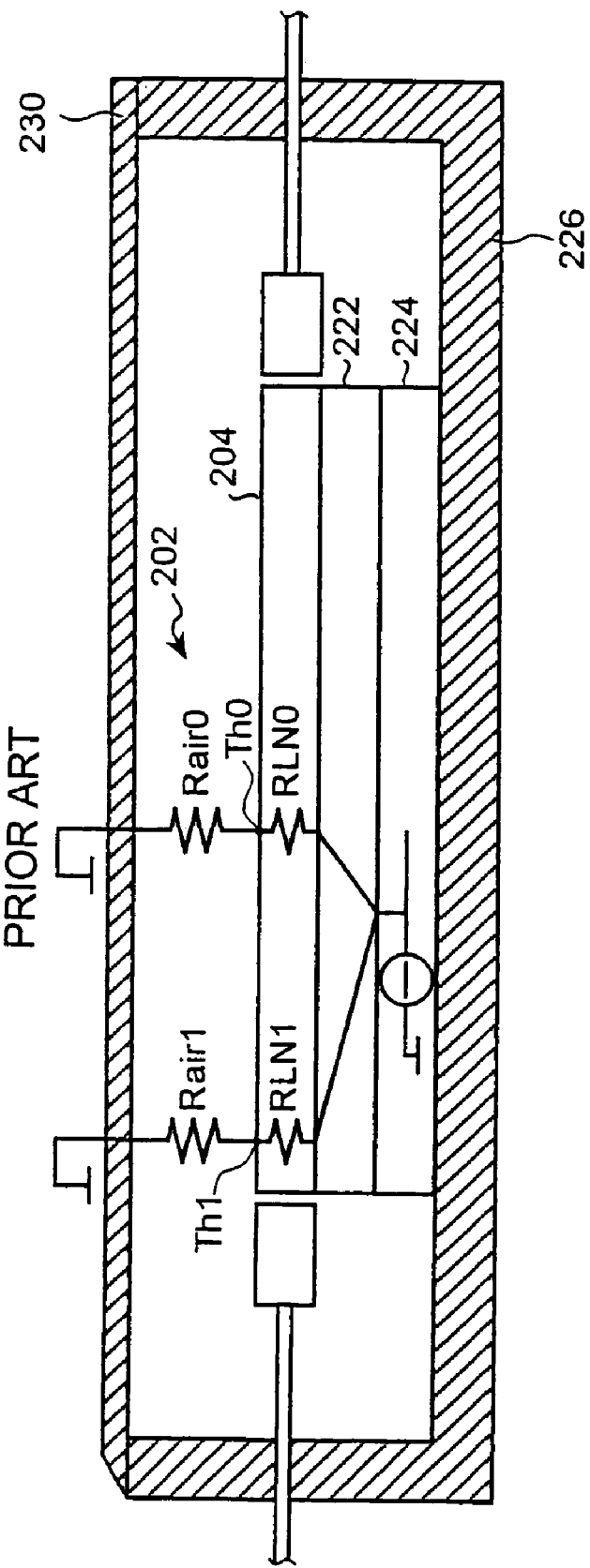
FIG. 15 is to explain the heat resistance of a module construction of a conventional technique.
Figure 16:
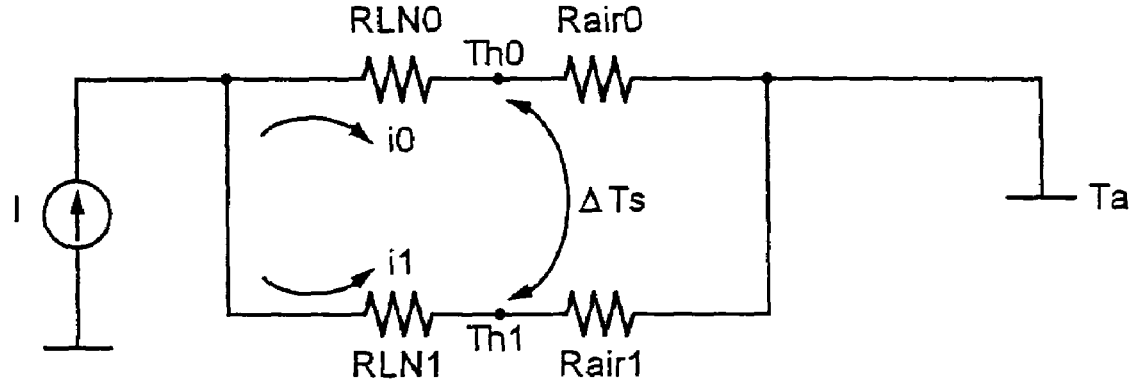
FIG. 16 is a circuit diagram of a heat equivalent circuit based on FIG. 15.

Next, an optical filter related to a seventh embodiment will be explained. The seventh embodiment is a configuration example when still more multi-channeling is carried out. FIG. 12 is a top view of the configuration of the essential portions of the module construction of the optical filter related to the seventh embodiment.

One-channel waveguide 108 is composed by serial connection of optical filters 100A, 100B and waveguides for four channels are arranged. When multi-channeling is carried out, the number of parallel arrangements is increased in the longitudinal direction of the figure. In such event, the soaking structure 102 is formed in the width that corresponds to the width (length in the longitudinal direction in the figure) of the LiNbO3 substrate 101 formed by the number of channels arranged in parallel. In addition, on the bridge substrate 103 which composes part of the soaking structure 102, the wiring patterns 104A, 104B should be formed in the number that correspond to the number of channels (strictly speaking, number of terminals of electrode 107A, 107B of the inter-digital transducer 106A, 106B on the LiNbO3 substrate 101). In addition, it is possible to increase the number of serial connections per channel, and in such event, the soaking structure 102 should be formed in the length (length in the lateral direction in the figure) that corresponds to the number of serial connections of optical filters. By the way, space H between the surface of the LiNbO3 substrate 101 and the bottom surface of the bridge substrate 103 and space W between the LiNbO3 substrate 101 and the side wall plate 118 (for both, see FIG. 2) must be provided as described above so that the soaking structure 102 does not come in direct contact with the LiNbO3 substrate 101.

The construction of the bridge substrate 103 shown in FIG. 12 corresponds to the configuration in which the openings 801A, 801B which enable the electrode 107A, 107B of each channel to be seen en bloc are formed at the position right above each electrode 107A, 107B of the inter-digital transducer described in the third embodiment and the number of channels is further increased. In addition, the configuration of the bridge substrate 103 may have the layout of wiring patterns changed as shown in the fourth embodiment even when multi-channeling is carried out or as explained in the fifth and the sixth embodiments, bridge substrates may be provided in the number that is same as the number of the optical filters. By the way, filters of different channels arranged up and bottom in the figure may be connected in series via bent waveguide (not illustrated).

According to the seventh embodiment, when the number of channels is increased to achieve multi-channeling, the case can be met only by changing the size of the soaking structure in accordance with the change of the size of LiNbO3 substrate.

In each of the embodiments, description is made with cases when a heater is used for a temperature control section used as examples, but it shall not be limited to heaters but the Peltier element, etc. may be used. In addition, in the third, the fourth, and the seventh embodiments, openings for wiring connection of connection energizing cables are formed in an elongated hole on the bridge substrate, but a configuration to form an independent hole one by one for each electrode may be adopted.

With respect to the configuration of soaking structure, since wire and other connection energizing cables are used for wiring patterns on the bridge substrate which compose part of the soaking structure, specific examples to have openings in the bridge substrate or to enable wiring connection of connection energizing cables by forming wiring patterns on the end face of the bridge substrate and using the relevant end face were shown. The case shall not be limited to this only but a through electrode which penetrates the bridge substrate from each of wiring patterns on the bridge substrate may be provided to connect to each electrode of the inter-digital transducer. Or a through hole that penetrates the bridge substrate itself from the head end side of wiring pattern of the top surface of the bridge substrate is formed to insert the through electrode, and the through electrode is connected to each electrode of inter-digital transducer. Or, for the through electrode, a flange or latching piece, etc. may be provided on one end for positioning as well as for easy connection work.

As described above, according to the optical device module related to the inventions described in each of embodiments, the temperature of the device (for example, waveguide type optical device) is intended to achieve uniformity by the use of a bridge substrate, and satisfactory performance of the device can be maintained.

According to the optical device module related to the inventions described in the embodiment, since wring patterns for supplying high-frequency signals, etc. to a waveguide type device are layout-designed and formed on the bridge substrate (soaking structure), line design of 50 Ω characteristic impedance of wiring patterns can be carried out, signal degradation can be prevented, and generation of cross-talks can be prevented. Furthermore, when multi-channeling is achieved, it is not necessary to secure a region for wiring patterns on the waveguide type optical device, it is not necessary to secure a region for installing wiring on the LiNbO3 substrate, either, an increase in the size of the LiNbO3 substrate can be avoided, and multi-channeling can be still more promoted.

According to the present invention, degradation of signals supplied to optical devices can be prevented, exhibiting an effect that the temperature of optical devices can be homogenized. In particular, even when multichanneling is carried out by providing a plurality of optical waveguides on one substrate, effects of homogenizing the temperature of optical device and preventing cross-talks from occurring between adjacent wiring patterns while avoiding an increase of wiring line regions can be achieved.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical device module comprising:
   an optical device with a plurality of electrodes disposed at predetermined positions;
   a substrate disposed oppositely to the optical device and with wiring patterns for connecting to the electrodes;
   a pair of side wall plates that hold the substrate on the optical device;
   the pair of side wall plates being positioned a top a soaking structure;
   said substrate and pair of side wall plates being arranged at a predetermined distance from said optical device along an incoming light advancing direction between each side wall plate and an inner surface of the optical device module; and
   a wiring that connects the electrodes to the wiring patterns to prevent signal degradation and cross-talk.

2. The optical device module according to claim 1, further comprising:
   a heating/cooling unit that performs a function selected from a group consisting of heating the optical device using self-generated heat and cooling the optical device by absorbing heat; and
   a soaking unit that uniformly transmits heat generated by the heating/cooling unit to an entire surface of the optical device, wherein
   the side wall plates are arranged on the soaking unit.

3. The optical device module according to claim 1, further comprising:
   a heating/cooling unit that performs a function selected from a group consisting of heating the optical device using self-generated heat and cooling the optical device by absorbing heat; and
   a soaking unit that uniformly transmits the heat generated by the heating/cooling unit to an entire surface of the optical device; and
   a package that holds the heating/cooling unit, wherein
   the side wall plates are arranged on the inner bottom surface of the package.

4. The optical device module according to claim 1, wherein at least one opening is formed on the substrate for passing the wiring so that the electrodes can be connected to the wiring patterns.

5. The optical device module according to claim 1, wherein the substrate includes a plurality of substrates.

6. The optical device module according to claim 2, wherein the heating/cooling unit is selected from a group consisting of a heater and a Peltier element.

7. The optical device module according to claim 3, wherein the heating/cooling unit is selected from a group consisting of a heater and a Peltier element.

8. The optical device module according to claim 1, wherein the optical device is a waveguide type optical device.

9. The optical device module according to claim 8, wherein an acousto-optic tunable optical filter is used for the waveguide type optical device.

10. The optical device module according to claim 1, wherein the substrate and the side wall plates are made of material having relatively low heat conductivity.

11. The optical device module according to claim 10, wherein the substrate and the side wall plates are made of ceramics.

12. The optical device module according to claim 1, wherein the electrodes are electrodes of an inter-digital transducer that excites surface acoustic wave.

13. The optical device module according to claim 1, further comprising:
   a lead-through block with wiring patterns provided on a side surface of the substrate for leading through the wiring patterns formed on the substrate and leads with free communication with the relevant wiring patterns; and
   a wiring that connects the wiring patterns to the wiring patterns.

14. The optical device module according to claim 1, wherein the wiring pattern includes a signal line for supplying specified signals and a ground line in communication with the ground.

15. The optical device module according to claim 14, wherein the wiring patterns is any of a 50-Ω line selected from a group consisting of a microstrip, a grounded coplanar, a coplanar.

16. An optical device module comprising:
   an optical device with a plurality of electrodes;
   a substrate with wiring patterns for connecting to the electrodes; and
   a pair of side wall plates that hold the substrate above the optical device, wherein
   the substrate is arranged at a predetermined vertical distance from the optical device, and
   each of the side wall plates is arranged at a predetermined horizontal distance from the optical device along an incoming light advancing direction between each side wall plate and an inner surface of the optical device module to prevent signal degradation and cross-talk.

17. The optical device module according to claim 16, further comprising:
a soaking unit upon which the pair of side wall plates rests.

18. The optical device module according to claim 17, wherein the pair of side wall plates holds the substrate at a predetermined vertical distance from the optical device to provide heat resistance.

19. An optical device module comprising:
an optical device with a plurality of electrodes disposed at predetermined positions;
a plurality of serially connected optical filters;
a substrate containing a plurality of wiring patterns for connecting to the electrodes and disposed oppositely to the optical device;
a pair of side wall plates that hold the substrate opposite the optical device;
the pair of side wall plates being positioned a top a soaking structure;
the substrate positioned atop the soaking structure for heat dissipation;
the soaking structure having a length corresponding to the number of serially connected optical filters; and
a wiring that connects the electrodes to the wiring patterns to prevent signal degradation and cross-talk.

20. An optical device module comprising:
an optical device with a plurality of electrodes disposed at predetermined positions;
a substrate disposed oppositely to the optical device and with wiring patterns for connecting to the electrodes;
a pair of side wall plates that hold the substrate on the optical device; and
a wiring that connects the electrodes to the wiring patterns, wherein
each of the side wall plates is arranged at a predetermined horizontal distance from the optical device so as not to come into contact with the optical device for the full width of the side wall plates.

* * * * *